US012542546B2

United States Patent
Van Ierssel et al.

(10) Patent No.: US 12,542,546 B2
(45) Date of Patent: Feb. 3, 2026

(54) TIMING MARGIN SENSOR

(71) Applicant: Movellus Circuits Incorporated, San Jose, CA (US)

(72) Inventors: Marcus Van Ierssel, Toronto (CA); Jeffrey Alan Fredenburg, Chicago, IL (US)

(73) Assignee: Movellus Circuits Inc., Ann Arbor, MI (US)

( * ) Notice: Subject to any disclaimer, the term of this patent is extended or adjusted under 35 U.S.C. 154(b) by 88 days.

(21) Appl. No.: 18/419,096

(22) Filed: Jan. 22, 2024

(65) Prior Publication Data

US 2024/0250673 A1   Jul. 25, 2024

Related U.S. Application Data

(60) Provisional application No. 63/440,624, filed on Jan. 23, 2023.

(51) Int. Cl.
| | |
|---|---|
| *H03K 5/14* | (2014.01) |
| *G01R 31/317* | (2006.01) |
| *G06F 1/08* | (2006.01) |
| *H03L 7/081* | (2006.01) |
| *H03K 5/00* | (2006.01) |

(52) U.S. Cl.
CPC ......... *H03K 5/14* (2013.01); *G01R 31/31727* (2013.01); *G06F 1/08* (2013.01); *H03L 7/0812* (2013.01); *H03K 2005/00058* (2013.01)

(58) Field of Classification Search
None
See application file for complete search history.

(56) References Cited

U.S. PATENT DOCUMENTS

| | | | | |
|---|---|---|---|---|
| 6,282,210 B1 * | 8/2001 | Rapport | ................ | H03L 7/0814 370/518 |
| 10,587,253 B1 * | 3/2020 | Huang | ................... | H03K 5/135 |

* cited by examiner

*Primary Examiner* — Cassandra F Cox

(74) *Attorney, Agent, or Firm* — Lance Kreisman; Peninsula Patent Group

(57) ABSTRACT

A timing margin sensor includes a delay circuit to generate a calibrated delay that corresponds to a known delay value of a logic circuit. Circuitry locks a first delay produced by the delay circuit to a clock period of a clock signal that is associated with the known delay value. A programmable selector adjusts the first delay to generate the calibrated delay, the calibrated delay including a timing margin component. Circuitry detects a change in supply voltage provided to the logic circuit based on a detected change in the calibrated delay. Clock adjustment circuitry selectively changes the clock period based on the detected change in the calibrated delay.

18 Claims, 9 Drawing Sheets

TIMING MARGIN SENSOR

CROSS-REFERENCE TO RELATED APPLICATIONS

This application is a Non-Provisional that claims priority to U.S. Provisional Application No. 63/440,624 filed Jan. 23, 2023, entitled TIMING MARGIN SENSOR, all of which is incorporated herein by reference in its entirety.

TECHNICAL FIELD

The disclosure herein relates to digital systems, subsystems, integrated circuits, and associated methods.

BACKGROUND

The longest combinatorial path of an integrated circuit is often referred to as the "critical path", and generally exhibits the longest delay in the circuit. A critical path typically dictates the minimum clock period or the maximum operating frequency for the overall design of the circuit. As a given integrated circuit ages, the actual timing of a critical path tends to degrade. Should the timing degrade beyond a certain timing margin threshold, failures may occur during circuit operation.

FIG. 1 illustrates the relationship between a critical path delay of a digital system to its supply voltage as it affects the voltage and timing margins for the system. At a nominal operating voltage 102, a delay through the critical path is less than a nominal clock period. The timing margin of the system is often defined as the difference between a critical path delay and the clock period, less some additional margins such as setup time, OCV, derates, and other times that are not captured.

Generally, and as shown in FIG. 1, the delay through a critical path increases as the supply voltage decreases, and at some critical voltage, such as at 104, the critical path delay will intersect the nominal clock period. When the critical path delay becomes more than the clock period, the system will start failing due to timing violations. That difference between the nominal operating voltage and the critical voltage below which timing failures occur is the voltage margin of the system. To avoid timing violations within the system when the supply voltage approaches the critical voltage, the clock frequency should generally be reduced.

While not shown in FIG. 1, a similar trend holds for the relationship between the critical path delay to other factors such as temperature, aging, and process variation. The other factors also include respective accompanying temperature margin, aging margin, and process margin parameters where, for a given temperature, age, process variation, or other parameter value, above or below some critical threshold, the clock frequency of the system should be reduced to prevent timing violations.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Digital systems, subsystems, integrated circuits, and associated methods are disclosed. In one embodiment, a timing margin sensor is disclosed. The timing margin sensor includes a delay circuit to generate a calibrated delay that corresponds to a known delay value of a logic circuit. Circuitry locks a first delay produced by the delay circuit to a clock period of a clock signal that is associated with the known delay value. A programmable selector adjusts the first delay to generate the calibrated delay, the calibrated delay including a timing margin component. Circuitry detects a change in supply voltage provided to the logic circuit based on a detected change in the calibrated delay. Clock adjustment circuitry selectively changes the clock period based on the detected change in the calibrated delay. By using the delay circuit to generate a calibrated delay that corresponds to the known delay value of the logic circuit, the response time involved in detecting and responding to timing violations, such as through voltage droop events, may be significantly reduced.

Figure 1:
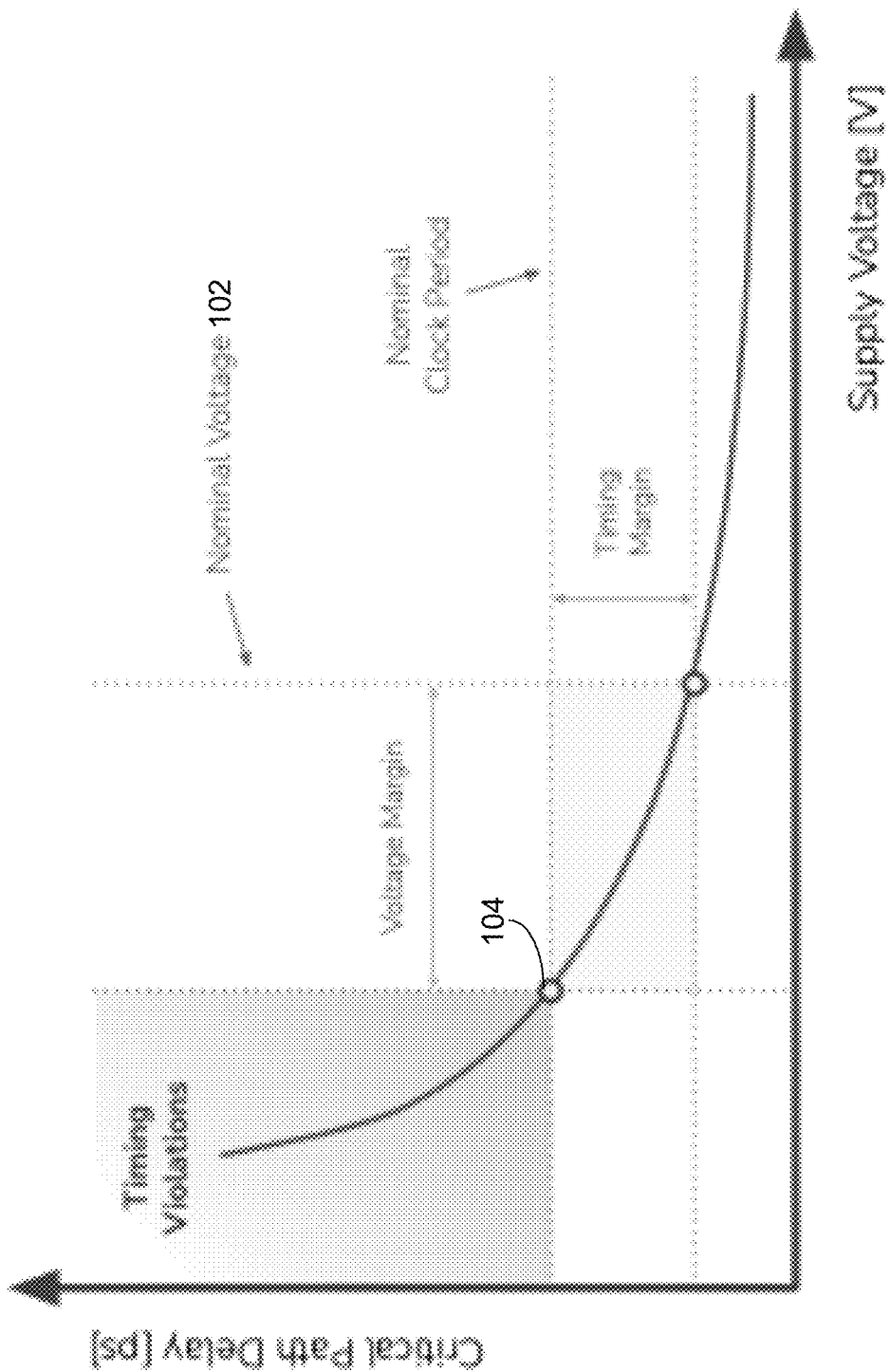
FIG. 1 illustrates a graph showing the relationship between a delay associated with a critical path of an integrated circuit versus a supply voltage of the circuit.
Figure 2:
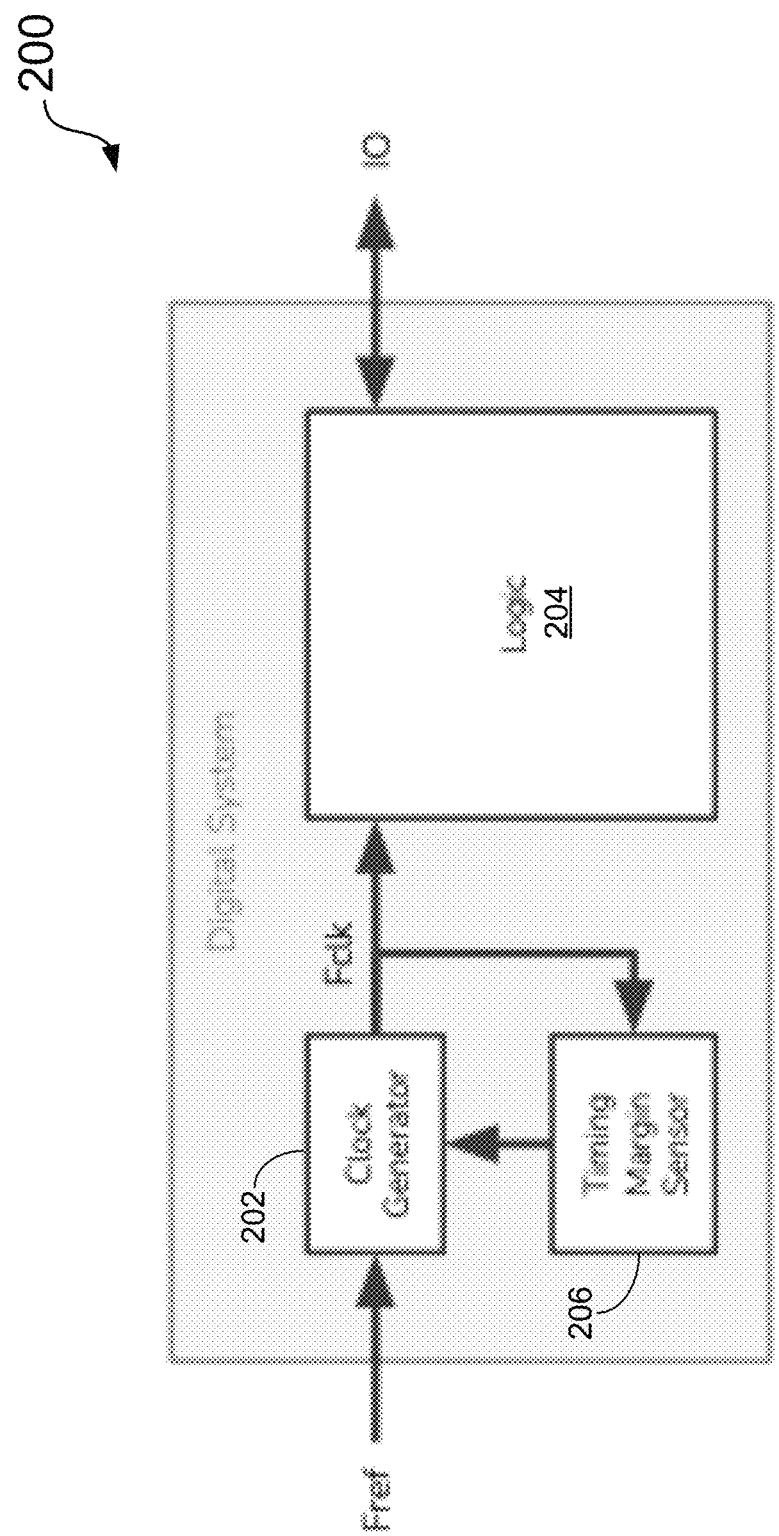
FIG. 2 illustrates one embodiment of a digital system.

FIG. 2 illustrates one embodiment of a digital system 200. The digital system 200 includes a clock generator 202 that receives a reference signal Fref (such as a reference clock signal), and generates a system clock signal Folk based on the reference signal Fref. For one embodiment, the system clock Folk serves as a system timing reference for logic 204 that is employed in the digital system 200. In other embodiments, the logic 204 may run on a clock that is half the frequency of Folk, such as on alternating edges. For some embodiments, should a user wish to generate an output every cycle, two clocks may be run in parallel with both running at half the Folk frequency but having opposite phases. For one embodiment, the clock generator 202 takes the form of a programmable frequency source such as a phase-locked loop (PLL), delay-locked loop (DLL), frequency-locked loop (FLL), or frequency divider. The logic 204 may include a portion of an integrated circuit (IC) chip, an entire IC chip, or a collection of interconnected IC chips. Included in the logic 204 is a critical path (not shown).

Further referring to FIG. 2, for one embodiment, the system clock signal Folk is also fed to a timing margin sensor 206. The timing margin sensor 206 measures, on a continuous basis, how much timing margin is available in the critical path of the logic 204. In general, and described more fully below, the timing margin sensor 206 identifies when the timing margin is reduced below a programmable threshold during operation of the logic 204. The timing margin sensor may then generate a request to the clock generator 202 to reduce the clock frequency (increase the clock period) and restore enough timing margin to enable the logic 204 to operate successfully.

Figure 3:
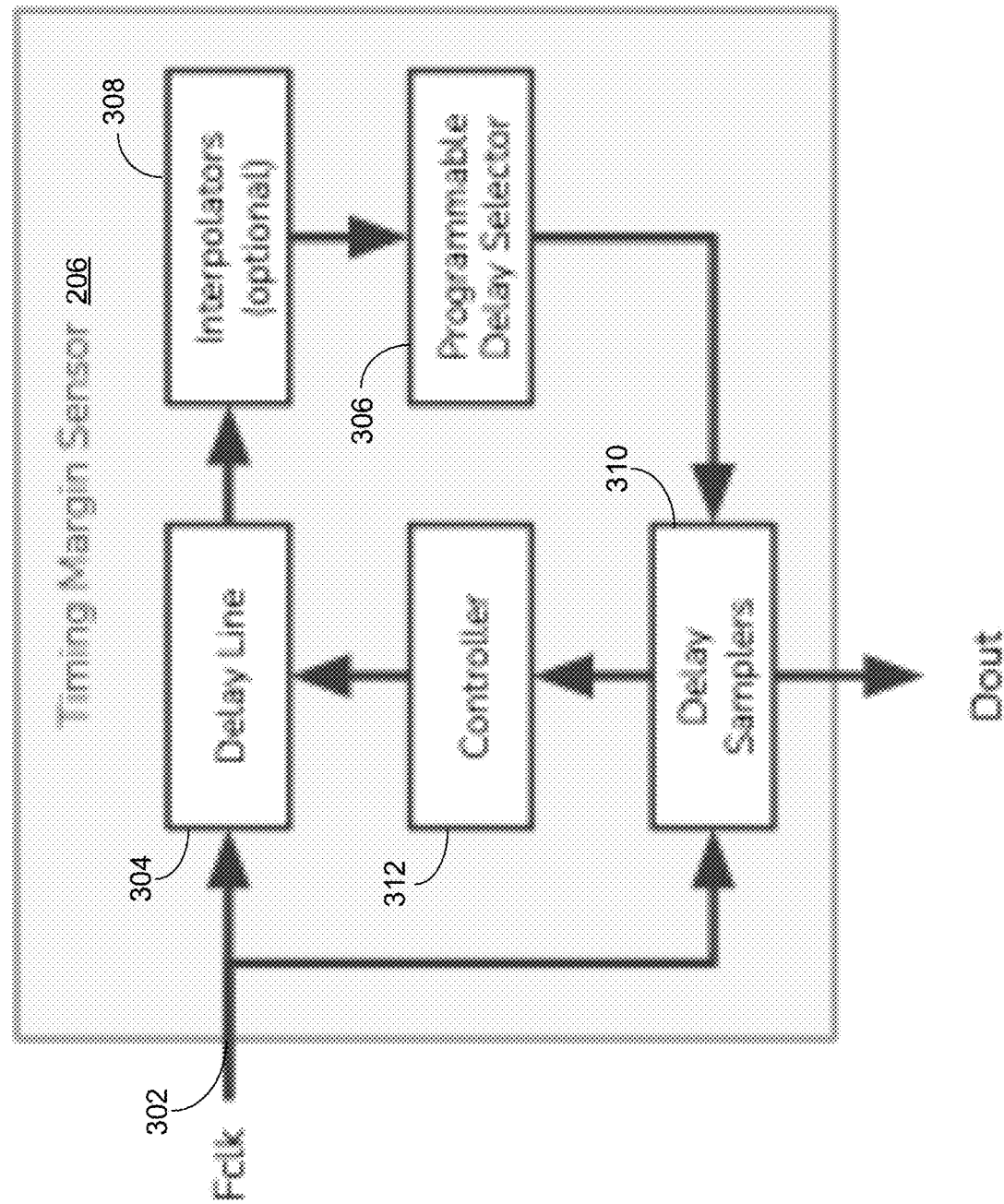
FIG. 3 illustrates one embodiment of the timing margin sensor of FIG. 2.
Figure 5:
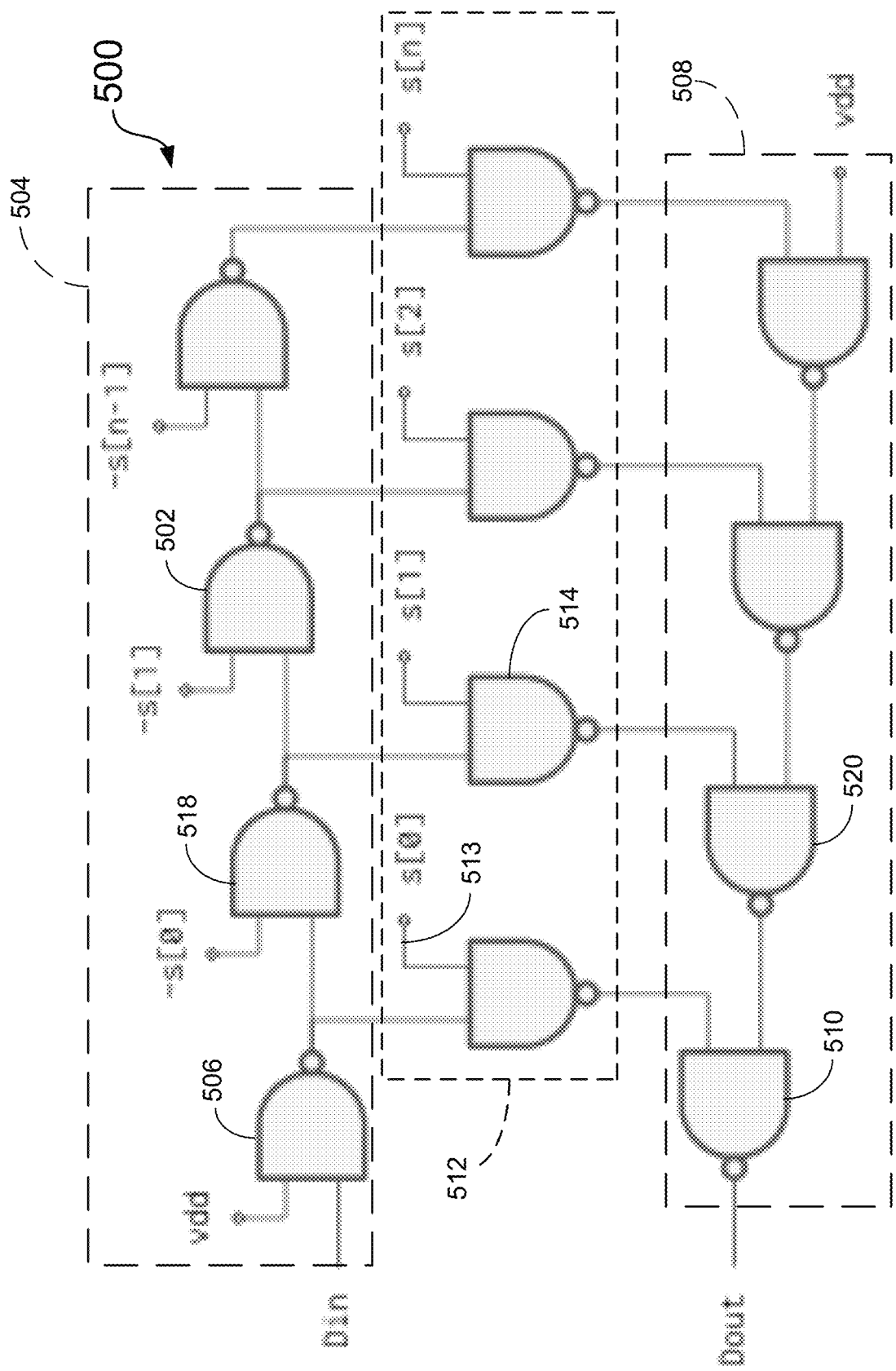
FIG. 5 illustrates one embodiment of the delay line of FIG. 3.

Referring now to FIG. 3, for one embodiment the timing margin sensor 206 includes a timing signal input, at 302, to receive the system clock signal Folk. A delay line 304 couples to the timing signal input 302 to receive a copy of the system clock signal Folk and is configured to produce a delay that corresponds to a clock period of the system clock signal Folk. For one embodiment, the delay line includes a plurality of serially-connected delay elements. Further detail for one specific implementation of a delay line is shown in FIG. 5, and more fully described below.

Figure 4:
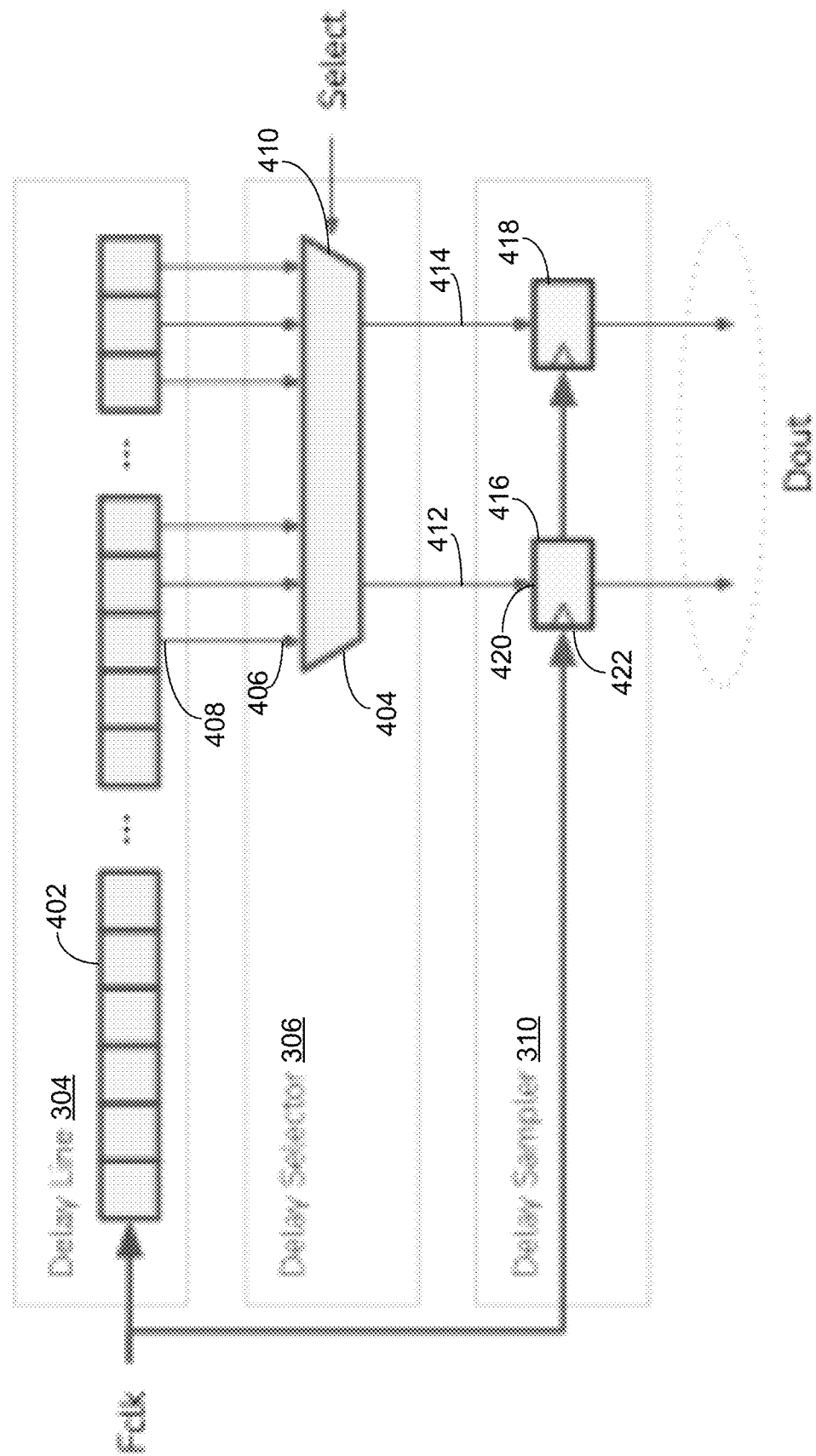
FIG. 4 illustrates further detail for one embodiment of the timing margin sensor of FIG. 3.

With continued reference to FIG. 3, a programmable delay selector 306 couples to the delay line 304 to select at least one delayed version of the system clock signal Folk having a delay value that is less than or equal to the system clock period. The programmable delay selector 306 provides a way to program a delay that can represent the timing margin of the digital system. For some embodiments, multiple different delays may be programmed that represent multiple thresholds. Further detail for one embodiment of the programmable delay selector 306 is shown in FIG. 4, and more fully described below. Optional interpolators 308 may be combined with the programmable delay selector 306 to provide finer granularity in the programmable delay selections. Thus, for one embodiment, the programmable delay selector 306 may produce a first delay value from a selection of delays that are relatively coarse (such as 10 ps increments) that may be supplemented by a second delay value from a selection of delays that are relatively fine (such as 1 ps increments) and produced by the optional interpolators 308.

Further referring to FIG. 3, one or more delay samplers 310 capture values corresponding to the delayed versions of the clock signal associated with the programmed delays. The delay samplers 310 may take the form of synchronous circuit elements such as flip-flops, latches, or the like. The captured delayed clock signal values are then fed to a controller 312. The controller 312 determines whether the captured values have arrived earlier or later than the system clock edge. If the controller 312 determines that the captured values have arrived earlier than the clock edge, the controller 312 will update a control code for the delay line 304 to increase the delay within the delay line 304. When the controller 312 determines that the captured values have arrived later than the clock edge, the controller 312 will update the control code for the delay line 304 to decrease the delay within the delay line 304. By tracking the delay relative to the clock period, the timing margin sensor 206 will maintain a delay that tracks the clock period.

FIG. 4 illustrates further detail for one embodiment of the timing margin sensor 206, including the delay line 304, the programmable delay selector 306, and the delay samplers 310. The delay line 304 includes a series of delay elements 402. The delay produced by the delay line 304 can be controlled by either changing the delay across any of the delay elements 402 themselves or by changing the number of delay elements 402 within the delay line 304 itself. For one embodiment, the programmable delay selector 306 includes a multiplexer 404 having multiple inputs 406 that are coupled to corresponding taps 408 of the multiple delay elements 402 of the delay line 304. Each input 406 thus provides a coupling to a separate delay element 402 that provides access to the system clock signal Folk as delayed by the number of delay elements 402 up to and including the selected tap 408. A control input, at 410, provides a way to select and pass through one or more of the taps, such as at 412 and 414 to provide versions of the system clock signal that are delayed by a fraction of the overall delay provided by the delay line (which corresponds to the period of the system clock). For one embodiment, the control input may be programmably changed at any time during operation of the timing margin sensor. While two delay values are shown as being selected in FIG. 4, any number of delayed signals may be extracted by adding additional multiplexing circuitry to the delay selector 306.

With continued reference to FIG. 4, for one embodiment, the delay samplers 310 include samplers 416 and 418 that correspond to each of the selected delayed clock signals selected by the delay selector 306. Each of the samplers 416 and 418 include a data input, such as at 420, to receive the delayed clock from the multiplexer 404, and a timing input, such as at 422, that receives the system clock Folk. With the delay samplers 416 and 418 configured this way, in operation the delay samplers 416 and 418 compare the arrival time of the system clock signal Folk with the programmably delayed versions of the system clock signal Folk itself. When the next clock edge arrives earlier than the delayed versions of the previous clock edge, the delay samplers 416 and 418 will sample a LOW value, producing a digital LOW. When the next clock edge arrives later than the delayed version of the previous clock edge, the delay samplers 416 and 418 will sample a HIGH value producing a digital HIGH.

Further referring to FIG. 4, the bit values from the delay samplers 416 and 418 will inform when the clock arrives relative to the programmed delay values. The values of these bits are used within the controller 312 (FIG. 3) to determine how to adjust the delay within the delay line 304. Additionally, the bit values can be used to determine whether the system has sufficient timing margin to operate without timing failures. If a delay is selected such that it corresponds to roughly 90% of the clock period, a LOW in the output would indicate that the next clock edge arrived earlier than 90% of the circuit delay. A LOW in the output indicates that either the clock frequency increased unexpectedly or the speed of the system dropped. In either case, a timing violation likely occurred.

FIG. 5 illustrates one specific embodiment of a digitally-controlled delay line 500 that may be employed by the timing margin sensor 206. The digitally-controlled delay line 500 includes a plurality of delay elements that are in the form of NAND gates 502. A first set 504 of the NAND gates are arranged sequentially in an input row, with a first one 506 of the first set 504 receiving an input signal Din that is NANDed with a fixed voltage level, such as Vdd. A second set 508 of the gates are arranged in an output row, with a last one 510 of the second set 508 producing an output signal Dout that represents a delayed version of the input signal Din, with the amount of delay based on the number of gates activated for the delay path. To establish a delay path, a third set 512 of NAND gates are individually coupled between pairs of NAND gates in the first set 504 and second set 508 that are similarly located. Each of the third set 512 of NAND gates includes a control input, such as at 513, that corresponds to a bit location in a control word. Activation of a given one of the NAND gates of the third set 512 thus shunts the corresponding pair of NAND gates of the first set 504 and the second set 508 to form the programmed delay path.

Further referring to FIG. 5, as an example, if control bit s[1] is asserted, the associated NAND gate, at 514, of the third set 512, will pass the input clock signal Din from the first set 504 to the second set 508. At the same time, the ~s[1]

control signal will disable the NAND gate at 502. The activated delay path thus involves the first NAND gate 506 and second NAND gate 518 of the first set 504, the shunting NAND gate 514, and the last NAND gate 510 and second-to-last gate 520 of the second set 508, for a total of five gates of delay. For one embodiment, s[x] is thermocoded such that s[x]=0 for x<n and s[x]=1 for x>=n, where n is the NAND gate number where the first and second sets of gates are shunted.

Figure 6:
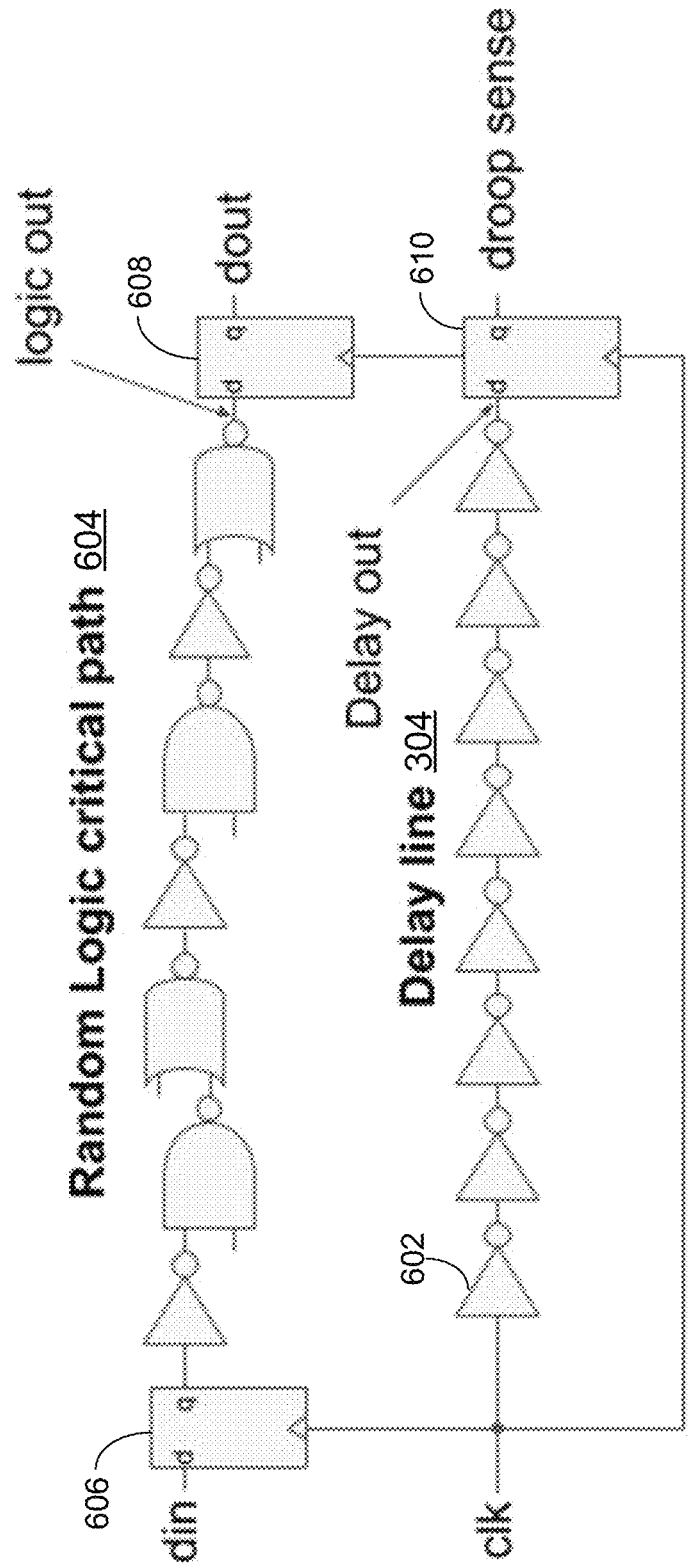
FIG. 6 illustrates how the delay line of the timing margin sensor of FIG. 3 is matched to a critical path.

FIG. 6 illustrates one specific example for calibrating one embodiment of the delay line 304 of the timing margin sensor 206 such that it generates a calibrated delay that allows the timing margin sensor 206 to approximate the critical path delay of the digital system 200 within an approximated timing margin. For this embodiment, the delay line 304 takes the form of a selected number of serially-connected inverters 602. The number of inverters selected is based on a known delay value exhibited by a logic critical path 604. For one embodiment, a selected even number of delay elements generates a delay that corresponds to the delay associated with the critical path 604. If an odd number of elements are used, the resulting polarity change in the output would need to be taken into account. An input flip-flop stage 606 couples to the input of the critical path 604 and is clocked by a system clock clk, which is also fed to the delay line 304. An output stage of flip-flops 608 and 610 captures the respective output signals "logic out" and "delay out" of the critical path 604 and the delay line 304. An output of the flip-flop 610 serves as a "droop sense" signal, and indicates a result of a comparison between the timing of the delay line output "delay out" and the following edge of the next clock signal.

Figure 7:
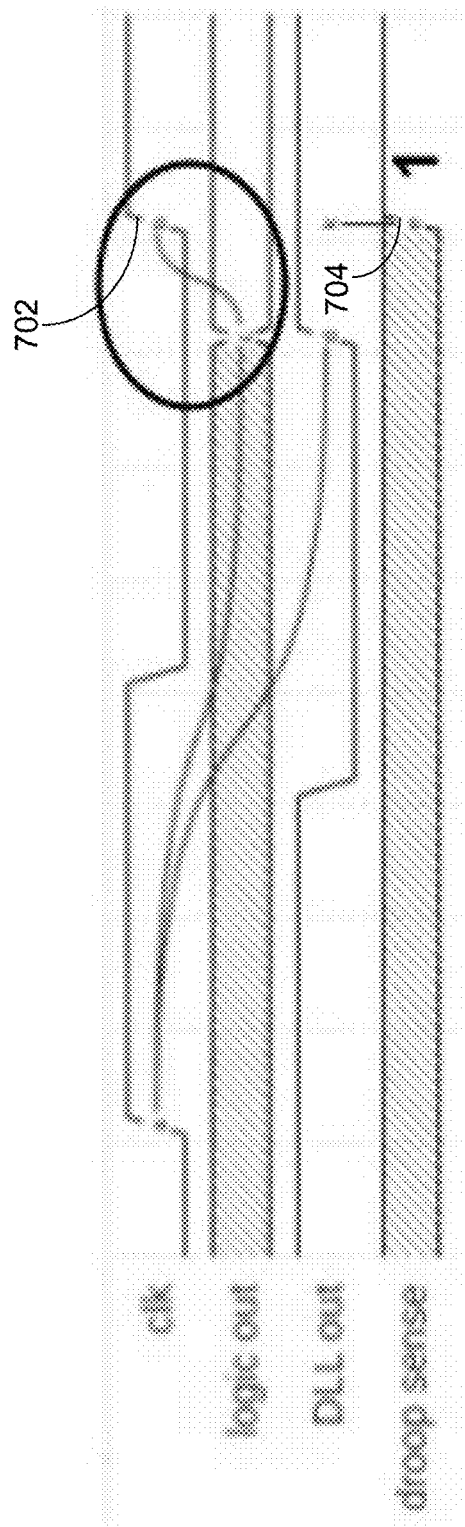
FIG. 7 illustrates a timing chart showing an acceptable setup timing for the circuit of FIG. 6.

In operation, and referring now to the timing chart of FIG. 7, when the next clock edge, at 702, arrives after the delayed output signal "DLL out", and the system samples a HIGH (logic "1") on the droop sense, at 704, the setup timing for the timing margin sensor is considered acceptable.

Figure 8:
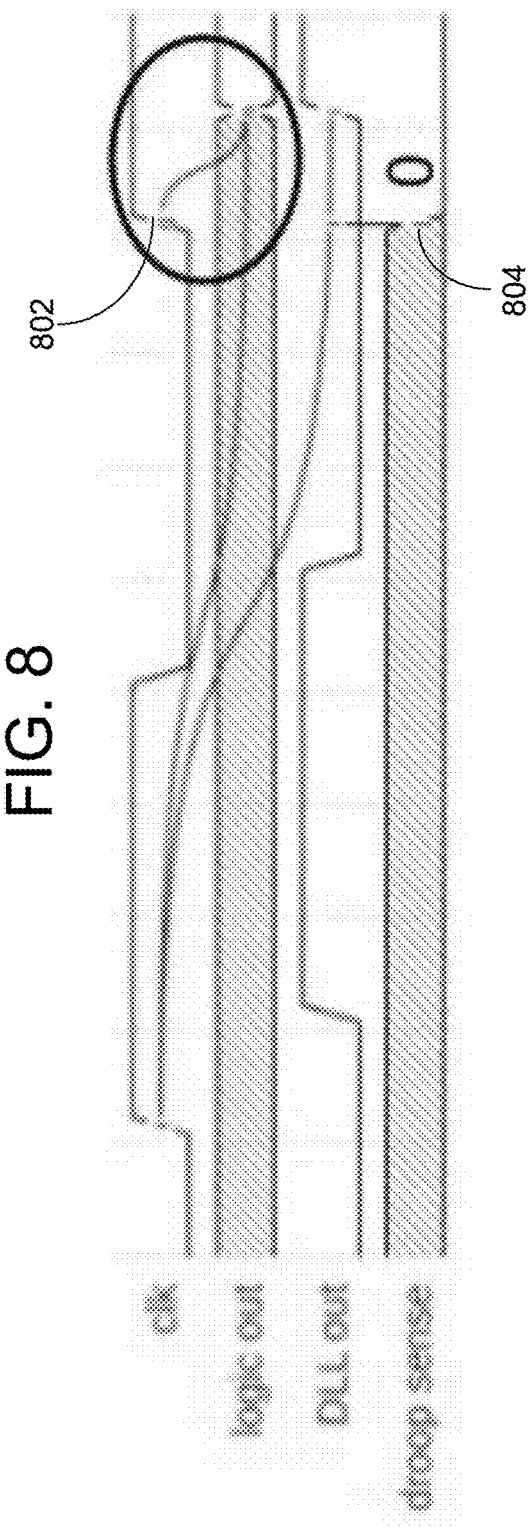
FIG. 8 illustrates a timing chart showing a failed setup timing for the circuit of FIG. 6.

Referring now to FIG. 8, when the clock arrives early, at 802, with respect to the delayed output signal "DLL out", and samples a LOW (logic "0") on the droop sense, at 804, the setup timing is considered violated. By estimating the delay of the critical path 604 (FIG. 6) by locking the delay line 304 (FIG. 3) to the clock period, and then adjusting the delay of the delay line 304 before the delay samplers 310 through the programmable selector 306, the timing margin sensor 206 can approximate the critical path delay of the system within an approximated timing margin. To increase the detected margin, the programmable delay selector 306 may be programmed to select a smaller delay. Similarly, to increase the detected margin, the programmable delay selector 306 may be programmed to select a larger delay.

Figure 9:
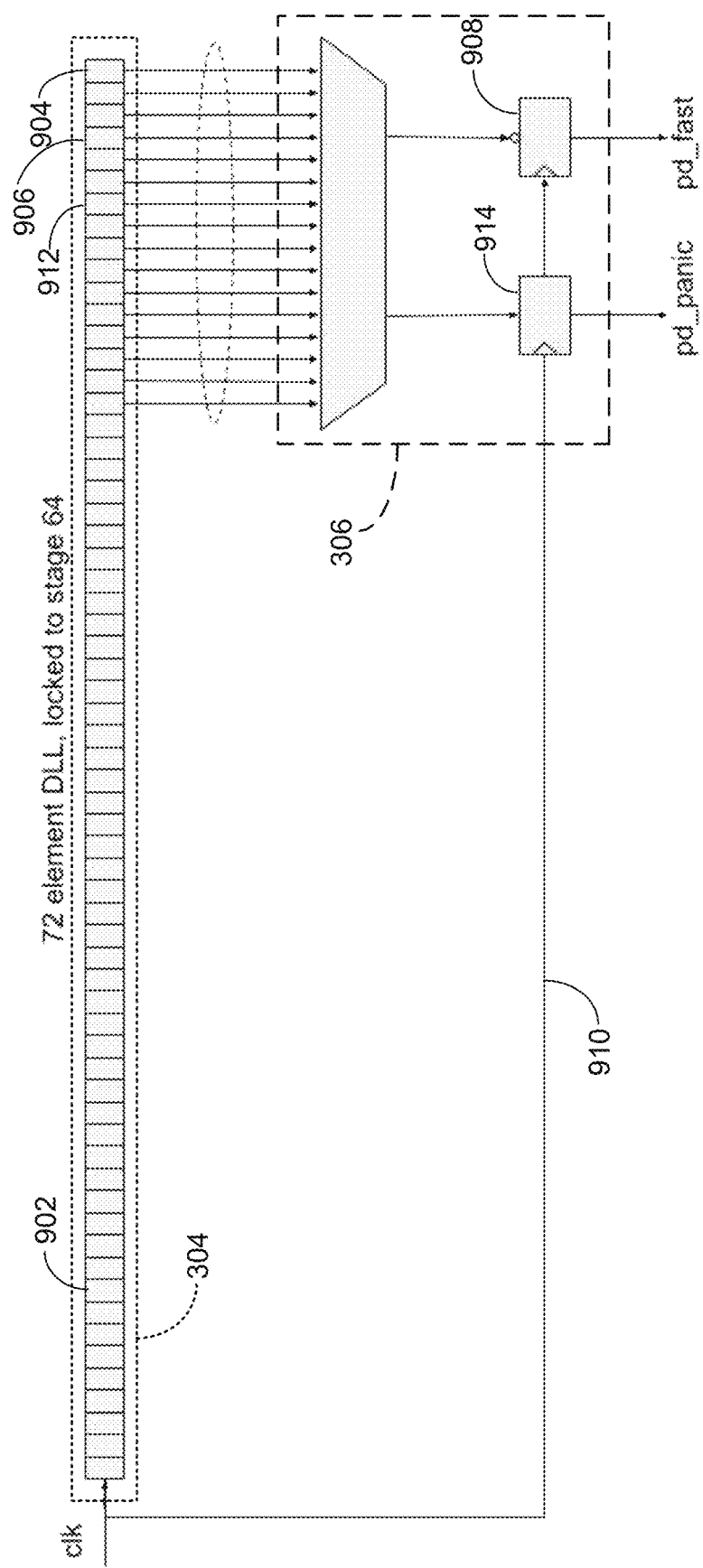
FIG. 9 illustrates a further embodiment of the delay line employed by the timing margin sensor of FIG. 3.

FIG. 9 illustrates one specific embodiment of the delay line 304 (FIG. 3) configured with the programmable delay selector 306. For this specific example, the delay line 304 includes seventy-two (72) delay elements 902, but locks to a period of an input clock "clk" at the sixty-fourth (64) element, at 904. To save power, the remaining eight elements may be deactivated. For one embodiment, a first delay threshold of ninety-five percent (95%), corresponding to delay element sixty-one (61), at 906, is programmed to represent 95% of the overall delay. An output signal "pd_panic" is generated by a first flip-flop 914 based on a comparison between a delayed version of the clock clk delayed by the 95% delay and the current clock edge provided by clock line 910. In a similar manner, a second delay threshold of ninety percent (90%), corresponding to delay element fifty-eight (58), at 912, is programmed to represent 90% of the overall delay. An output signal "pd_fast" is generated by a second flip-flop 908 based on a comparison between a delayed version of the clock delayed by the 90% delay and the current clock edge provided by the clock line 910.

In operation, when the output signal pd_panic is HIGH, the system is maintaining at least 5% of the clock period as available timing margin. When the output signal pd_panic is LOW, the clock has arrived early, the system no longer has that 5% margin available. Similarly, when the output signal pd_fast is HIGH, the system is maintaining 10% margin, but when the output signal pd_fast is LOW, the system has lost that 10% margin. While the accuracy of the 5% and 10% depend on the linearity of the delay elements, the programmability of the delay line 304 allows for both calibration and for the delay selection to be adjusted.

Figure 10:
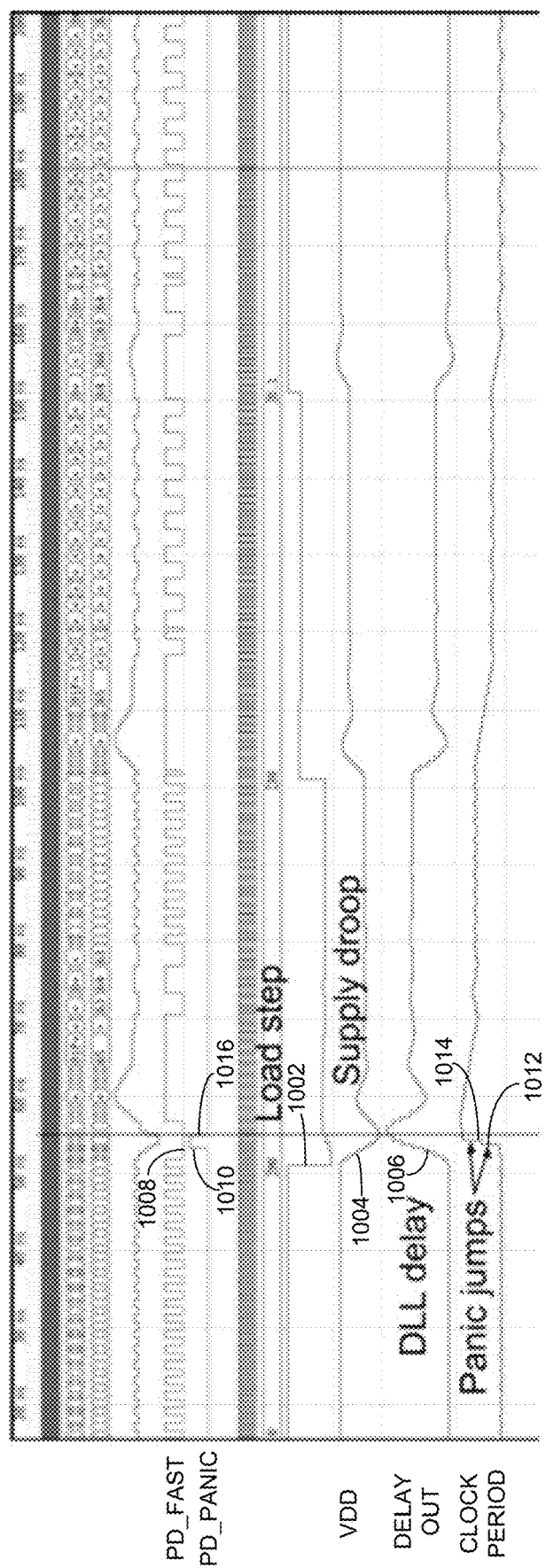
FIG. 10 illustrates a timing chart illustrating various waveforms during a simulation of the digital system of FIG. 2.

FIG. 10 illustrates timing waveforms associated with a simulation involving the setup of FIG. 9. During operation of the system, a step load in supply current is supplied to the system, at 1002, which causes the supply voltage to fluctuate, at 1004. The fluctuations in the supply voltage cause the delay through the delay line to fluctuate, at 1006.

Further referring to FIG. 10, the timing margin sensor 206 continuously samples the programmed delay using the system clock, so the timing margin sensor 206 can detect changes in the timing margin quickly. As shown in the waveforms, the 95% threshold delay "pd_panic" triggers LOW, at 1008, within a few clock cycles of the supply voltage dropping below the threshold associated with the 5% margin. Similarly, the 90% threshold delay "pd_fast" signal triggers HIGH, at 1010, within a clock cycle of the supply voltage dropping below the threshold associated with the 10% margin.

With continued reference to FIG. 10, when the 90% threshold delay signal "pd_fast" signal is detected as HIGH, at 1010, the clock period is doubled, at 1012. Such an increase in the clock period (corresponding to a reduction in frequency) is referred to as a panic step. Since the step load is severe enough that a signal reduction in the clock frequency does not restore the timing margin, the clock period is again doubled, at 1014, on the following edge. The second increase restores the timing margin and allows the 90% timing margin threshold "pd_fast" to return LOW, at 1016. Finer adjustments may be made to the clock period as the 95% timing margin threshold "pd_panic" signal alternates between HIGH and LOW values. These finer adjustments cause the clock frequency to slowly ramp up and down in response to the timing margin sensor output.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<u><signalname></u>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A method of operation in a digital system, comprising:
   calibrating a delay circuit to generate a first delay that corresponds to a known delay value of a logic circuit, the calibrating including
   locking the first delay produced by the delay circuit to a clock period of a clock signal that is associated with the known delay value, and
   adjusting the first delay with a programmable selector to generate a calibrated delay, the calibrated delay including a timing margin component; and
   detecting a change in supply voltage provided to the logic circuit by monitoring the delay circuit for a change in the calibrated delay; and
   compensating for the detected change in the calibrated delay by adjusting the clock period.

2. The method of claim 1, wherein the monitoring of the delay circuit for a change in the calibrated delay includes:
   detecting the change in the calibrated delay to a second delay that differs from the calibrated delay by at least a threshold delay value.

3. The method of claim 2, wherein:
   the threshold delay value is a programmable value that corresponds to a threshold timing margin.

4. The method of claim 1, wherein:
   the locking of the first delay produced by the delay circuit to the clock period is performed by a locked-loop circuit.

5. The method of claim 1, wherein the adjusting of the first delay with the programmable selector to generate the calibrated delay includes:
   selecting a first delayed version of the clock signal;
   comparing the first delayed version of the clock signal to a next clock edge of the clock signal; and
   adjusting the first delay based on a phase difference between the first delayed version of the clock signal and the next clock edge of the clock signal.

6. The method of claim 5, wherein the adjusting of the clock period includes:
   changing the clock period to a first adjusted value;
   determining whether a desired timing margin criteria is satisfied; and
   selectively adjusting the clock period to a second adjusted value based on whether the desired timing margin criteria is satisfied.

7. The method of claim 6, wherein:
   the changing of the clock period to the first adjusted value is responsive to receipt of the next clock edge of the clock signal; and
   the selectively adjusting the clock period to the second adjusted value is responsive to receipt of a subsequent clock edge that immediately follows the next clock edge of the clock signal.

8. A timing margin sensor, comprising:
   a delay circuit to generate a first delay that corresponds to a known delay value of a logic circuit;
   locked-loop circuitry to lock a first delay produced by the delay circuit to a clock period of a clock signal that is associated with the known delay value;
   a programmable selector to adjust the first delay to generate a calibrated delay, the calibrated delay including a timing margin component;
   monitoring circuitry to detect a change in supply voltage provided to the logic circuit the corresponds to a detected change in the calibrated delay; and
   clock adjustment circuitry to selectively change the clock period based on the detected change in the calibrated delay.

9. The timing margin sensor of claim 8, wherein:
   the delay circuit comprises a digitally-controlled delay line of multiple delay elements.

10. The timing margin sensor of claim 8, wherein:
the programmable selector provides a coarse adjustment component to the first delay as a first component of the calibrated delay.

11. The timing margin sensor of claim 10, further comprising:
interpolator circuitry to provide a fine adjustment component to the first delay that is combined with the coarse adjustment component.

12. The timing margin sensor of claim 8, wherein the programmable selector is to select a first delayed version of the clock signal, and wherein the timing margin sensor further includes:
control circuitry to compare the first delayed version of the clock signal to a next clock edge of the clock signal, the control circuitry to adjust the first delay based on a phase difference between the first delayed version of the clock signal and the next clock edge of the clock signal.

13. The timing margin sensor of claim 12, wherein:
the clock adjustment circuitry is to change the clock period to a first adjusted value;
the control circuitry is to determine whether a desired timing margin criteria is satisfied in response to the first adjusted value of the clock period; and
wherein the clock adjustment circuitry is to selectively adjust the clock period to a second adjusted value based on whether the desired timing margin criteria is satisfied.

14. The timing margin sensor of claim 13, wherein:
the clock adjustment circuitry changes the clock period to the first adjusted value in response to receipt of the next clock edge of the clock signal; and
the clock adjustment circuitry selectively adjusts the clock period to the second adjusted value in response to receipt of a subsequent clock edge that immediately follows the next clock edge of the clock signal.

15. A digital system, comprising:
a programmable clock generator to produce a system clock signal from a reference clock signal;
system circuitry synchronized to the system clock signal; and
a timing margin sensor including
a delay circuit to generate a first delay that corresponds to a known delay value of a system circuitry;
locked-loop circuitry to lock the first delay produced by the delay circuit to a clock period of a clock signal that is associated with the known delay value;
a programmable selector to adjust the first delay to generate a calibrated delay, the calibrated delay including a timing margin component; and
monitoring circuitry to detect a change in supply voltage provided to the system circuit that corresponds to a detected change in the calibrated delay; and
clock adjustment circuitry to selectively change the clock period based on the detected change in the calibrated delay.

16. The digital system of claim 15, wherein:
the programmable selector provides a coarse adjustment component to the first delay as a first component of the calibrated delay.

17. The digital system of claim 16, further comprising:
interpolator circuitry to provide a fine adjustment component to the first delay that is combined with the coarse adjustment component.

18. The digital system of claim 15, wherein the programmable selector is to select a first delayed version of the clock signal, and wherein the timing margin sensor further includes:
control circuitry to compare the first delayed version of the clock signal to a next clock edge of the clock signal, the control circuitry to adjust the first delay based on a phase difference between the first delayed version of the clock signal and the next clock edge of the clock signal.

* * * * *